US011781509B1

(12) United States Patent
Takara

(10) Patent No.: US 11,781,509 B1
(45) Date of Patent: Oct. 10, 2023

(54) EXHAUST GAS RECIRCULATION STRUCTURE

(71) Applicant: ISUZU MOTORS LIMITED, Tokyo (JP)

(72) Inventor: Ryoma Takara, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 18/182,201

(22) Filed: Mar. 10, 2023

(30) Foreign Application Priority Data

Mar. 22, 2022 (JP) ................................ 2022-045733

(51) Int. Cl.
*F02M 26/30* (2016.01)
*F02M 26/41* (2016.01)
*F02M 26/50* (2016.01)
*F02M 26/17* (2016.01)

(52) U.S. Cl.
CPC ............ *F02M 26/17* (2016.02); *F02M 26/30* (2016.02); *F02M 26/41* (2016.02); *F02M 26/50* (2016.02)

(58) Field of Classification Search
CPC ........ F02M 26/17; F02M 26/22; F02M 26/30; F02M 26/41; F02M 26/50
USPC ....................................... 123/568.12, 568.17
See application file for complete search history.

(56) References Cited

U.S. PATENT DOCUMENTS 7,958,874 B2 * 6/2011 Kobayashi ............. F02M 26/51 123/568.25
8,931,461 B2 * 1/2015 Weber ..................... F02B 47/08 123/568.17
11,591,991 B1 * 2/2023 McConville ........... F02M 26/04
2017/0198664 A1 * 7/2017 Bramson ................ F02M 26/35
2017/0218887 A1 * 8/2017 Kuske .................... F02M 26/35
2019/0136803 A1 * 5/2019 So .................... F02M 35/10222
2020/0124005 A1 4/2020 Sugahara

FOREIGN PATENT DOCUMENTS

JP 2019-007389 A 1/2019

* cited by examiner

*Primary Examiner* — Erick R Solis
(74) *Attorney, Agent, or Firm* — Shih IP Law Group, PLLC

(57) ABSTRACT

An exhaust gas recirculation structure includes an EGR cooler and an EGR duct, and the EGR duct includes an inflow portion into which the exhaust gas flowing out from the EGR cooler flows, a flow path, and an outflow portion from which the exhaust gas flows out. The flow path is provided such that the height on the side of the inflow portion is lower than the height on the side of the outflow portion, and has a region in which the distance between the center line of a flow path cross section of the flow path and a line along the lowest end in the height direction gradually increases from the outflow portion side toward the inflow portion side.

6 Claims, 7 Drawing Sheets

EXHAUST GAS RECIRCULATION STRUCTURE

CROSS-REFERENCE TO RELATED APPLICATIONS

The present application claims priority to Japanese Patent Applications number 2022-45733, filed on Mar. 22, 2022. The contents of this application are incorporated herein by reference in their entirety.

BACKGROUND OF THE INVENTION

Conventionally, a vehicle is provided with an exhaust gas recirculation structure. Japanese Patent Application Laid-Open No. 2019-7389 discloses an EGR duct which is provided above an engine and through which exhaust gas flowing out from an EGR cooler is passed toward an inlet manifold.

Since condensed water is generated in the EGR duct, it is necessary to discharge the condensed water from the EGR duct to a predetermined position. The conventional technology has a problem in that it is difficult to configure a structure for discharging condensed water in the EGR duct to a predetermined position while preventing an increase in size of the engine room.

BRIEF SUMMARY OF THE INVENTION

It is an object of the present invention to provide an exhaust gas recirculation structure in which condensed water is easily discharged from the EGR duct, while suppressing an increase in the size of the EGR duct in the height direction of the vehicle.

According to a first aspect of the present invention, provided is an exhaust gas recirculation structure, including: an EGR cooler provided in an EGR passage that causes exhaust gas to be recirculated from an exhaust passage of an engine of the vehicle to an intake passage; and an EGR duct that is provided in the engine and passes the exhaust gas flowing out from the EGR cooler toward the intake passage. The EGR duct includes: an inflow portion into which the exhaust gas flowing out from the EGR cooler flows; a flow path through which the exhaust gas flowing in from the inflow portion flows; and an outflow portion from which the exhaust gas flowing through the flow path flows out. The flow path is provided such that a height thereof on the flow path side becomes lower than a height thereof on the outflow portion side, and has a region in which a distance between a center line of a flow path cross section of the flow path and a line along a lowest end in the height direction of the flow path cross section becomes gradually larger from the outflow portion side toward the inflow portion side.

DETAILED DESCRIPTION OF EMBODIMENTS

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[State in which the Exhaust Gas Recirculation Structure S is Provided in the Engine E]

Figure 1:
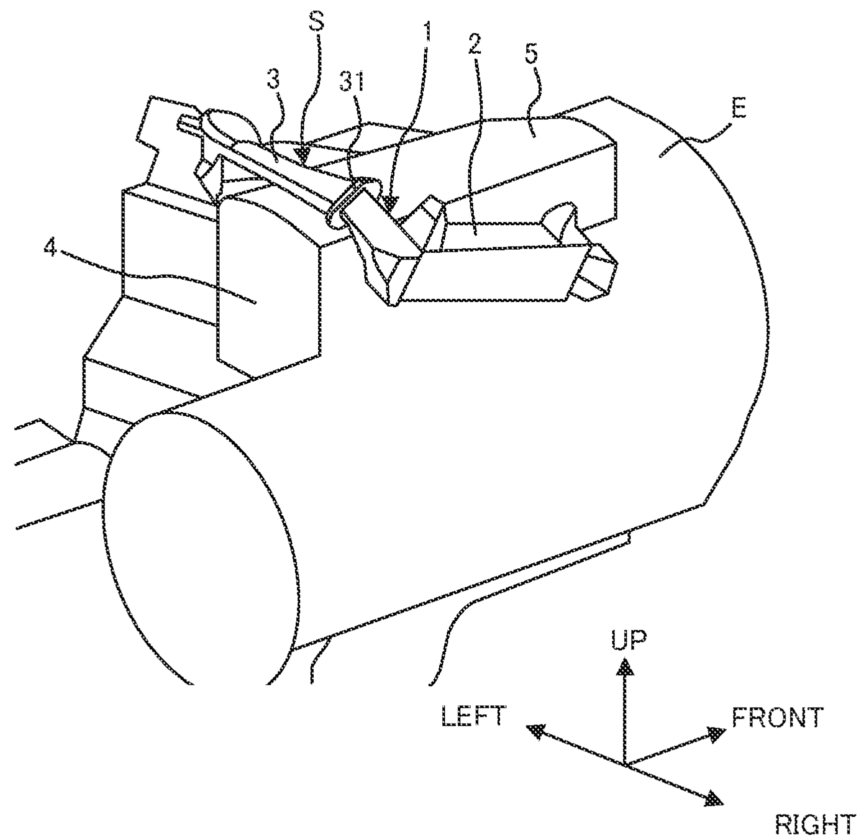
FIG. 1 shows a state in which an exhaust gas recirculation structure according to the present embodiment is provided in an engine.

FIG. 1 is a view showing a state in which an exhaust gas recirculation structure S according to the present embodiment is provided in an engine E. The exhaust gas recirculation structure S has an EGR (Exhaust Gas Recirculation) passage 1, an EGR cooler 2, and an EGR duct 3.

The EGR passage 1 is a passage for recirculating exhaust gas from an exhaust passage (not shown) of the engine E of the vehicle to an intake passage (not shown). The engine E is a gasoline engine or a diesel engine, for example. The engine E includes a cylinder head body 4 and a head cover 5. The cylinder head body 4 houses an intake valve (not shown), an exhaust valve (not shown), a cam shaft (not shown), and the like. The head cover 5 covers the cylinder head body 4 from above. The head cover 5 is attachable to and detachable from the cylinder head body 4.

The exhaust passage is a passage through which exhaust gas generated in the combustion chamber of the engine E flows. The exhaust passage includes an exhaust pipe, for example. The exhaust passage is provided on the right side of the engine E shown in FIG. 1. Since high-temperature exhaust gas flows through each component (e.g., exhaust passage and the like) on the exhaust side of the engine E, these components are often made of cast iron or the like having a sufficient thickness.

The intake passage is a passage through which air flows toward the combustion chamber of the engine E. The intake passage includes an intake manifold, for example. The intake passage is provided on the left side of the engine E shown in FIG. 1. In order to reduce the weight of each component (e.g., the intake passage and the like) on the intake side of the engine E, an aluminum material or a resin having a thin thickness is often used.

The EGR cooler 2 cools the exhaust gas flowing into the EGR cooler 2. The EGR cooler 2 cools the exhaust gas by exchanging heat between the exhaust gas and cooling water. The EGR cooler 2 is provided in the EGR passage 1. One end of the EGR cooler 2 is connected to an exhaust passage. The exhaust gas flowing out from the exhaust passage flows into the EGR cooler 2.

The EGR duct 3 is a component for passing the exhaust gas flowing out from the EGR cooler 2 toward the intake passage. The EGR duct 3 is provided in the EGR passage 1. One end of the EGR duct 3 is connected to the other end of the EGR cooler 2. The exhaust gas flowing out from the EGR cooler 2 flows into the EGR duct 3. The other end of the EGR duct 3 is connected to the intake passage. The exhaust gas flowing out from the EGR duct 3 flows into the intake passage. The EGR duct 3 is provided above the engine E, for example.

Specifically, the EGR duct 3 is provided above the head cover 5 in a state where the longitudinal direction of the EGR duct 3 extends in the width direction of the engine E. Note that FIG. 1 only shows an example of the layout of the EGR duct 3. In addition to the example in which the EGR duct 3 is provided above the head cover 5 as shown in FIG. 1, the EGR duct 3 may be disposed in front of or behind the cylinder head body 4.

[Structure of the EGR Duct 3]

Figure 2A:
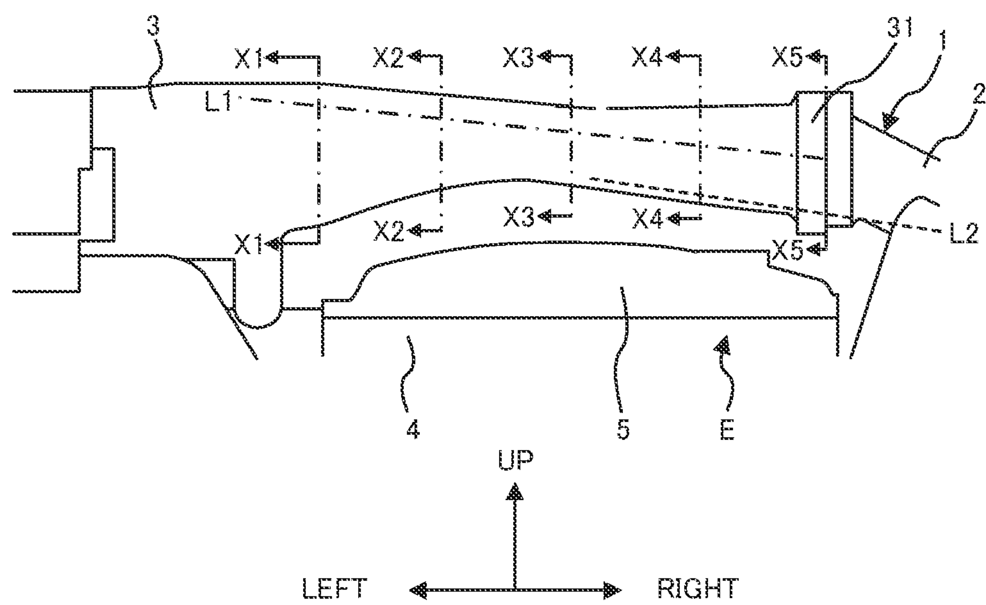
FIG. 2A shows a structure in the vicinity of an EGR duct when the exhaust gas recirculation structure shown in FIG. 1 is provided in the engine, viewed from the rear side of a vehicle.
Figure 2B:
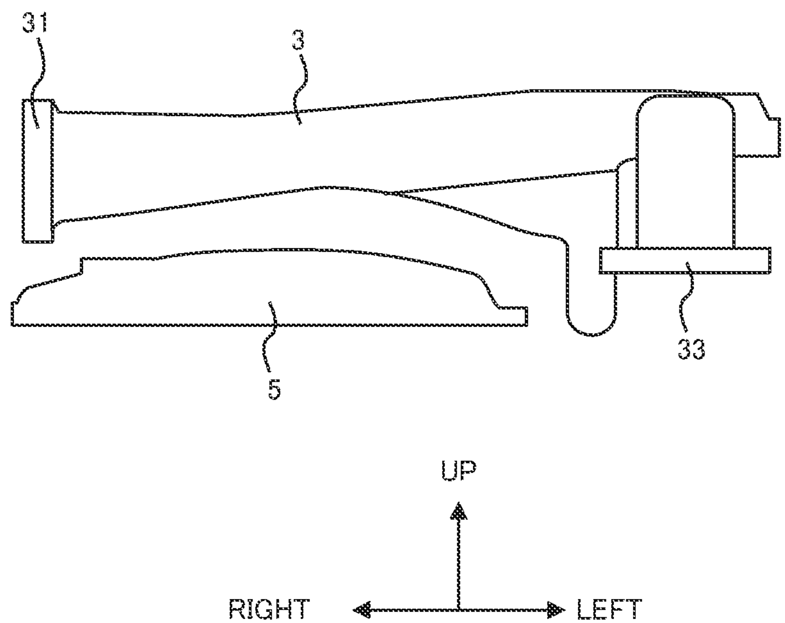
FIG. 2B shows a structure of the EGR duct and a head cover when the exhaust gas recirculation structure shown in FIG. 1 is provided in the engine, viewed from the front side of the vehicle.
Figures 3A, 3B, 3C, 3D, 3E:
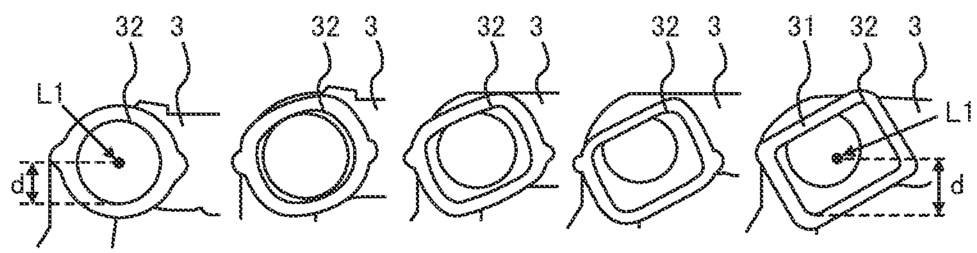
FIG. 3A is a cross-sectional view taken along a line X1-X1 of FIG. 2A.
FIG. 3B is a cross-sectional view taken along a line X2-X2 of FIG. 2A.
FIG. 3C is a cross-sectional view taken along a line X3-X3 of FIG. 2A.
FIG. 3D is a cross-sectional view taken along a line X4-X4 of FIG. 2A
FIG. 3E is a cross-sectional view taken along a line X5-X5 of FIG. 2A

FIGS. 2A and 3B are each a view showing a structure of the EGR duct 3. FIG. 2A is a view showing a structure in the vicinity of the EGR duct 3 in a state where the exhaust gas recirculation structure S shown in FIG. 1 is provided in the engine E, as viewed from the rear side of the vehicle. FIG. 2B is a view showing a structure of the EGR duct 3 and the head cover 5 in a state where the exhaust gas recirculation structure S shown in FIG. 1 is provided in the engine E, viewed from the front side of the vehicle.

FIGS. 3A to 3E are each a cross-sectional view of the EGR duct 3. FIG. 3A is a cross-sectional view taken along the line X1-X1 of FIG. 2A. FIG. 3B is a cross-sectional view taken along the line X2-X2 of FIG. 2A. FIG. 3C is a cross-sectional view taken along the line X3-X3 of FIG. 2A. FIG. 3D is a cross-sectional view taken along the line X4-X4 of FIG. 2A. FIG. 3E is a cross-sectional view taken along the line X5-X5 of FIG. 2A. The positions of the line X2-X2, the line X3-X3, and the line X4-X4 in the longitudinal direction of the EGR duct 3 correspond to the positions of ¼, ½, and ¾ distances from the line X1-X1 when the distance between the line X1-X1 and the line X5-X5 is set to 1.

The EGR duct 3 includes an inflow portion 31, a flow path 32, and an outflow portion 33. The inflow portion 31 is a portion into which the exhaust gas flowing out from the EGR cooler 2 flows. The inflow portion 31 has an opening through which the exhaust gas flows. The flow path 32 is a portion through which the exhaust gas flowing in from the inflow portion 31 flows. The outflow portion 33 is a portion where the exhaust gas flowing through the flow path 32 flows out. The outflow portion 33 has an opening through which the exhaust gas flowing through the flow path 32 flows.

As shown in FIGS. 2A and 2B, the flow path 32 is provided such that the height of the flow path 32 on the side of the inflow portion 31 is lower than the height of the flow path 32 on the side of the outflow portion 33. In other words, the flow path 32 is formed so as to gradually become lower toward the exhaust side of the engine E.

Since the exhaust gas cooled by the EGR cooler 2 flows inside the EGR duct 3, condensed water, which is a liquid containing an exhaust gas component, is generated by condensation of moisture. Since the condensed water contains a high concentration of exhaust gas components, when the condensed water comes into contact with each component (aluminum material or resin material) on the intake side, these components may be corroded and damaged.

For this reason, the EGR duct 3 preferably has a structure in which condensed water is accumulated on the exhaust side of the engine E (the components in this portion being made of cast iron or the like having a sufficient thickness). In the exhaust gas recirculation structure S, since the flow path 32 is provided such that the height of the flow path 32 on the inflow portion 31 side becomes lower than the height of the flow path 32 on the outflow portion 33 side, the condensed water can flow from the intake side of the engine E to the exhaust side of the engine E. Therefore, intrusion of condensed water into the intake side can be prevented, and each component on the intake side can be protected.

As shown in FIG. 2A, the flow path 32 has a region in which the distance between the center line L1 of the flow path cross section of the flow path 32 and the line L2, which is along the lowest end in the height direction of the flow path cross section of the flow path 32, gradually increases from the outflow portion 33 side toward the inflow portion 31 side. The center line L1 is a line along the center point of the flow path cross section of the flow path 32. The line L2 along the lowest end is a line formed by connecting a plurality of points positioned at the lowest end inside the flow path 32, in the longitudinal direction of the flow path 32. The condensed water in the flow path 32 flows along the line L2.

As shown in FIGS. 3A to 3E, the flow path 32 has a cross-sectional area that is constant, as an example, and the flow path cross section gradually changes from a circle to a polygon from the outflow portion 33 side toward the end portion on the inflow portion 31 side. Specifically, the flow path cross section of the flow path 32 gradually changes from a circle to a quadrangular shape from the outflow portion 33 side toward the end portion on the inflow portion 31 side. More specifically, the flow path cross section of the flow path 32 is formed in a shape in which one of the corners of the quadrangular shape is positioned at the lowest end, in the region having the quadrangular cross section. With such a configuration, as shown in FIGS. 3A and 3E, the distance d from the center line L1 to the lowest position gradually increases. As a result, as shown in FIG. 2A, the distance between the center line L1 and the line L2 gradually increases toward the inflow portion 31 side.

The fact that the distance between the center line L1 and the line L2 gradually increases toward the inflow portion 31 side means that the inclination angle of the line L2 corresponding to the gradient of the flow path through which the condensed water flows can be made larger than that of the center line L1. According to the EGR duct 3 of the present embodiment, the condensed water can be easily discharged by such a configuration.

Figures 4A, 4B, 4C:
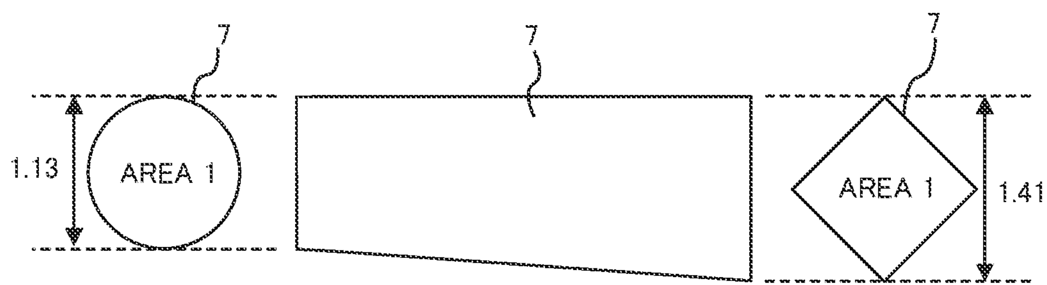
FIG. 4A shows a flow path with a flow path cross section that gradually changes from the circular shape to the quadrangular shape, in the longitudinal direction.
FIG. 4B shows a circular flow path cross section at one end of the flow path.
FIG. 4C shows a quadrangular flow path cross section at the other end of the flow path.

FIGS. 4A to 4C are each a diagram schematically showing a flow path 7 with a flow path cross section that gradually changes from a circular shape to a quadrangular shape. FIG. 4A is a diagram showing the flow path 7 with the flow path cross section that gradually changes from the circular shape to the quadrangular shape, in the longitudinal direction. FIG. 4B is a diagram showing the circular flow path cross section at one end of the flow path 7. FIG. 4C is a diagram showing the quadrangular flow path cross section at the other end of the flow path 7.

In the flow path 7, when the area of the circular flow path cross section (FIG. 4B) and the area of the quadrangular flow path cross section (FIG. 4C) are both 1, by arranging the quadrangular flow path cross section so that one corner of the quadrangular shape is positioned at the lowest end, the height (1.41) of the quadrangular flow path cross section becomes larger than the height (1.13) of the circular flow path cross section. As a result, when the upper end of the flow path 7 is horizontal, the lowest end of the quadrangular flow path cross section is positioned lower than the lowest end of the circular flow path cross section. Therefore, the inclination angle of the lower end of the flow path 7 is increased. Such an effect can also be obtained in a case where the cross section of the flow path is, for example, a polygon such as a triangle, a pentagon, or a hexagon.

In the exhaust gas recirculation structure S, even if the inclination angle of the EGR duct 3 with respect to the horizontal direction is made relatively small, a sufficient angle of the floor surface of the flow path 32 through which the condensed water flows in the EGR duct 3 with respect to the horizontal direction can be easily ensured. Therefore, in the exhaust gas recirculation structure S, the condensed water can be easily discharged from the EGR duct 3, while suppressing an increase in the size of the EGR duct 3 in the height direction of the vehicle.

In the exhaust gas recirculation structure S, the EGR duct 3 having the flow path 32 described above is provided. When the exhaust gas flows from the inflow portion 31 side toward the outflow portion 33 side, the cross section of the flow path gradually changes from a polygon to a circle, so that pressure loss can be reduced.

Further, in the exhaust gas recirculation structure S, the EGR duct 3 having the flow path 32 with the flow path cross section formed with a quadrangular shape having one corner positioned at the lowest end of the flow path cross section is provided, as described above. Therefore, the condensed water in the EGR duct 3 accumulates inside this corner of the quadrangle, so that the condensed water can easily flow.

As shown in FIG. 2A, the center line L1 of the flow path cross section of the flow path 32 and the line L2 along the lowest end in the height direction of the flow path cross section of the flow path 32 are both straight lines. In the exhaust gas recirculation structure S, since both the center line L1 and the line L2 along the lowest end are straight lines, the bending portion of the EGR duct 3 is reduced, so that the pressure loss of the EGR duct 3 can be reduced. Further, although the flow path of the present embodiment has a relatively complex cross-sectional shape, in a case such as this where the center line L1 and the line L2 are straight lines, for example, it is easy to form components. The center line L1 and the line L2 may extend in a direction orthogonal to a direction in which a plurality of cylinders of the engine E are arranged, for example.

Further, in the exhaust gas recirculation structure S, since the flow path 32 through which the exhaust gas and the condensed water flow can be shortened, the weight of the EGR duct 3 can be reduced. In addition, since the bending portion of the EGR duct 3 is reduced, it is more difficult for stress concentration due to heat or vibration to occur, and so the EGR duct 3 is less likely to be damaged.

[Placement of the EGR Duct 3 with Respect to the Head Cover 5]

Figure 5:
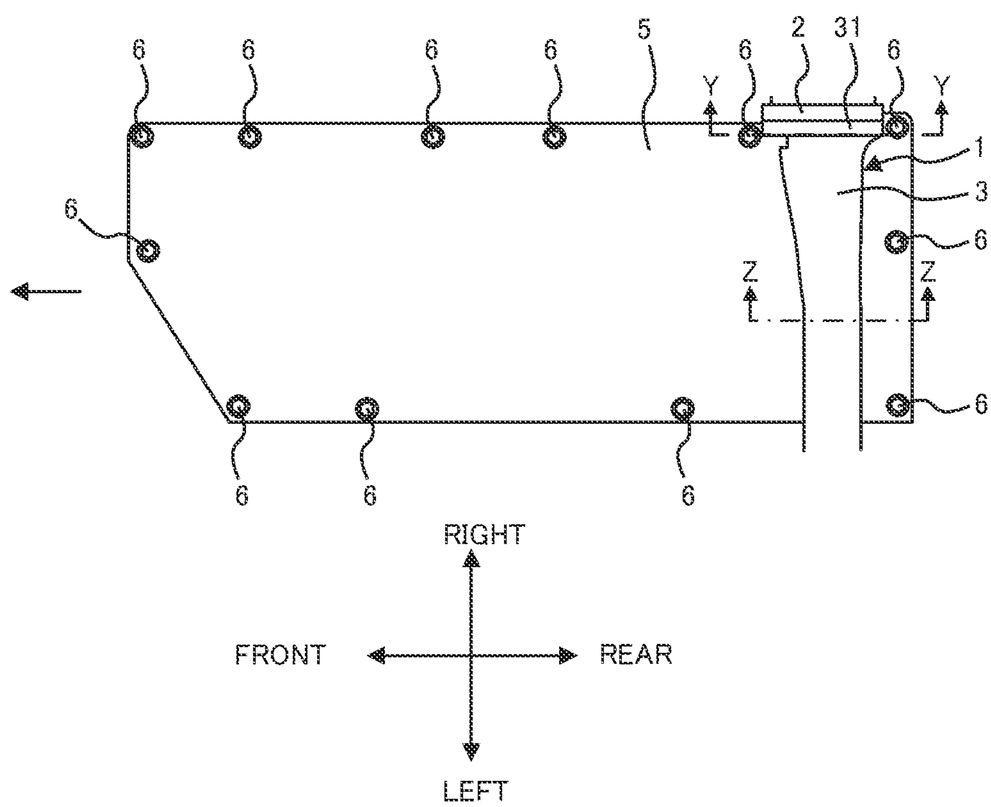
FIG. 5 shows a structure in the vicinity of a head cover when the exhaust gas recirculation structure shown in FIG. 1 is provided in an engine, as viewed from above.

FIG. 5 is a view showing a structure in the vicinity of the head cover 5 when the exhaust gas recirculation structure S shown in FIG. 1 is provided in the engine E, as viewed from above.

The engine E has a plurality of coupling members 6. Each coupling member 6 is a component for fixing the head cover 5 to the cylinder head body 4. Each coupling member 6 is a bolt, for example. The plurality of coupling members 6 are arranged at the edge of the head cover 5. The head cover 5 is fixed to the cylinder head body 4 by inserting the coupling members 6 into holes (not shown) formed in the head cover 5 and holes (not shown) formed in the cylinder head body 4, and fastening the coupling members 6.

The user can remove the head cover 5 from the cylinder head body 4 in a state where the plurality of coupling members 6 are detached from the head cover 5 and the cylinder head body 4. Specifically, the user can remove the head cover 5 from the cylinder head body 4 by moving the head cover 5 toward the front side of the vehicle with respect to the cylinder head body 4 in a state where the plurality of coupling members 6 are detached from the head cover 5 and the cylinder head body 4.

As shown in FIG. 5, the EGR duct 3 is provided above the head cover 5 so as not to be positioned above the plurality of coupling members 6. By providing the EGR duct 3 in the exhaust gas recirculation structure S, when the valve clearance is to be adjusted, for example, the plurality of coupling members 6 can be detached from the head cover 5 and the cylinder head body 4 without detaching the EGR duct 3 and the EGR cooler 2. Therefore, in the exhaust gas recirculation structure S, the head cover 5 can be easily detached from the cylinder head body 4.

Figures 6A, 6B:
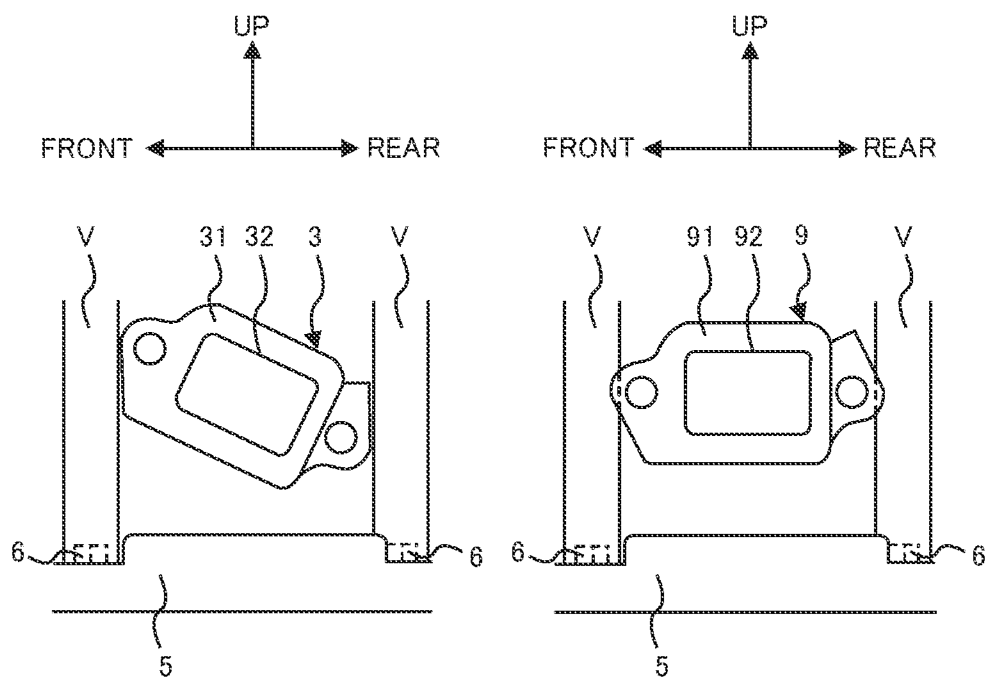
FIG. 6A shows a state in which a tool comes into contact with coupling members on respective sides of an inflow portion of the EGR duct.
FIG. 6B shows a state in which a tool is in contact with coupling members on respective sides of an inflow portion of an EGR duct, serving as a comparative example.

FIGS. 6A and 6B are each a view showing a state of the inflow portion 31 of the EGR duct 3 with respect to the head cover 5. FIG. 6A is a view showing a state in which a tool V comes into contact with the coupling members 6 on respective sides of the inflow portion 31 of the EGR duct 3. FIG. 6A corresponds to a cross-sectional view taken along the line Y-Y of FIG. 5. FIG. 6B is a view showing a state in which the tool V is in contact with the coupling members 6 on respective sides of an inflow portion 91 of an EGR duct 9, serving as a comparative example.

As shown in FIG. 6A, the inflow portion 31 of the EGR duct 3 is inclined with respect to the head cover 5, such that the distance between the inflow portion 31 and the head cover 5 increases toward the front of the vehicle. As shown in FIG. 6B, when the inflow portion 91 of the EGR duct 9 is not inclined with respect to the head cover 5, since the length of the inflow portion 91 in the longitudinal direction of the vehicle is greater than the length between the plurality of coupling members 6 in the longitudinal direction of the vehicle, the tool V that loosens the plurality of coupling members 6 interferes with the inflow portion 91.

On the other hand, as shown in FIG. 6A, in the exhaust gas recirculation structure S, since the inflow portion 31 of the EGR duct 3 is inclined with respect to the head cover 5 such that the distance between the inflow portion 31 and the head cover 5 increases toward the front of the vehicle, the length of the inflow portion 31 in the longitudinal direction of the vehicle is less than the length between the plurality of coupling members 6 in the longitudinal direction of the vehicle. As a result, in the exhaust gas recirculation structure S, the tool V that loosens the coupling member 6 does not interfere with the inflow portion 31.

Figure 7:
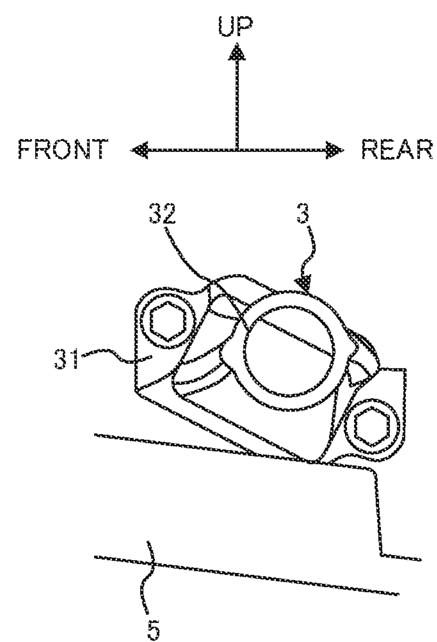
FIG. 7 shows a state of the head cover when the head cover is detached from a cylinder head body.

FIG. 7 is a view showing a state of the head cover 5 when the head cover 5 is detached from the cylinder head body 4. FIG. 7 corresponds to a cross-sectional view taken along the line Z-Z of FIG. 5. In the exhaust gas recirculation structure S, as described above, the inflow portion 31 of the EGR duct 3 is inclined with respect to the head cover 5 so that the distance between the inflow portion 31 and the head cover 5 increases toward the front of the vehicle. Therefore, a gap is formed between the lower surface of the inflow portion 31 and the head cover 5 fixed to the cylinder head body 4, and the gap widens toward the front side. In other words, as shown in FIG. 7, a lower surface of the inflow portion 31 is inclined with respect to the head cover 5, such that the vertical distance between the inflow portion 31 and the head cover 5 increases toward a direction in which the head cover 5 moves when the head cover 5 is detached from the cylinder head body 4.

As a result, as shown in FIG. 7, when the head cover 5 is detached from the cylinder head body 4 and moved to the front side of the vehicle, the head cover 5 can be inclined with respect to the horizontal direction, such that the front side of the head cover 5 in the longitudinal direction of the vehicle is positioned higher than the rear side of the head cover 5 in the longitudinal direction of the vehicle. Therefore, in the exhaust gas recirculation structure S, the head cover 5 can be easily detached from the cylinder head body 4.

As shown in FIGS. 2A and 2B, the lower surface of the EGR duct 3, when viewed from the rear side of the vehicle and the front side of the vehicle, has a shape following the upper surface of the head cover 5, and a gap is formed between the lower surface of the EGR duct 3 and the upper surface of the head cover 5, for example. Since the exhaust gas recirculation structure S has such an EGR duct 3, the head cover 5 can be moved upward with respect to the cylinder head body 4 when the head cover 5 is detached from the cylinder head body 4. As a result, in the exhaust gas recirculation structure S, the head cover 5 can be easily detached from the cylinder head body 4.

[Effects of the Exhaust Gas Recirculation Structure S According to the Present Embodiment]

The exhaust gas recirculation structure S according to the present embodiment includes the EGR duct 3, which is provided such that the height of the inflow portion 31 side is lower than the height of the outflow portion 33 side and includes the flow path 32 having a region in which the distance between the center line L1 of the flow path cross section of the flow path 32 and the line L2 along the lowest end in the height direction of the flow path cross section of the flow path 32 gradually increases from the outflow portion 33 side toward the inflow portion 31 side.

As a result, in the exhaust gas recirculation structure S, even if the inclination angle of the EGR duct 3 with respect to the horizontal direction is small, a sufficient angle of the bottom surface of the flow path 32, through which the condensed water flows in the EGR duct 3, with respect to the horizontal direction can be easily ensured. Therefore, in the exhaust gas recirculation structure S, the condensed water can be easily discharged from the EGR duct 3, while suppressing an increase in the size of the EGR duct 3 in the height direction of the vehicle.

Although the embodiments of the present invention have been described above, the technical scope of the present invention is not limited to the embodiments described above, and various modifications and changes can be made without departing from the scope of the present invention. For example, all or a portion of the device may be functionally or physically distributed and integrated in arbitrary units. Further, new embodiments resulting from arbitrary combinations of a plurality of embodiments are also included in the embodiments of the present invention. The effect of the new embodiment caused by the combination has the effect of the original embodiment.

What is claimed is:

1. An exhaust gas recirculation structure, comprising:
an EGR cooler provided in an EGR passage that causes exhaust gas to be recirculated from an exhaust passage of an engine of the vehicle to an intake passage; and
an EGR duct that is provided in the engine and passes the exhaust gas flowing out from the EGR cooler toward the intake passage, wherein
the EGR duct includes:
an inflow portion into which the exhaust gas flowing out from the EGR cooler flows;
a flow path through which the exhaust gas flowing in from the inflow portion flows; and
an outflow portion from which the exhaust gas flowing through the flow path flows out, and
the flow path is provided such that a height thereof on the flow path side becomes lower than a height thereof on the outflow portion side, and has a region in which a distance between a center line of a flow path cross section of the flow path and a line along a lowest end in the height direction of the flow path cross section becomes gradually larger from the outflow portion side toward the inflow portion side.

2. The exhaust gas recirculation structure according to claim 1, wherein
the center line and the line along the lowest end are both straight lines.

3. The exhaust gas recirculation structure according to claim 1, wherein
the flow path cross section of the flow path has a constant cross-sectional area, and gradually changes from a circle to a polygon from the outflow portion side toward an end portion on the inflow portion side.

4. The exhaust gas recirculation structure according to claim 3, wherein
the flow path cross section of the flow path gradually changes from a circular shape to a quadrangular shape from the outflow portion side toward the end portion on the inflow portion side, and in the region of the flow path cross section having the quadrangular shape, one corner of the quadrangular shape is positioned at the lowest end of the flow path cross section.

5. The exhaust gas recirculation structure according to claim 4, wherein
the engine includes:
a cylinder head body that houses an intake valve, an exhaust valve, and a camshaft;
a head cover that is attachable to and detachable from the cylinder head body and covers the cylinder head body from above; and
a plurality of coupling members for fixing the head cover to the cylinder head body, by being inserted from above into holes formed in the head cover and holes formed in the cylinder head body; and
the EGR duct is provided with a shape which is positioned above the head cover but not positioned above the plurality of coupling members.

6. The exhaust gas recirculation structure according to claim 5, wherein
a lower surface of the inflow portion is inclined with respect to the head cover, such that a vertical distance between the inflow portion and the head cover increases toward a direction in which the head cover moves when the head cover is detached from the cylinder head body.

* * * * *